(12) United States Patent
Oya

(10) Patent No.: US 8,580,427 B2
(45) Date of Patent: Nov. 12, 2013

(54) ASSEMBLED BATTERY

(75) Inventor: Takumi Oya, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 230 days.

(21) Appl. No.: 13/247,053

(22) Filed: Sep. 28, 2011

(65) Prior Publication Data

US 2012/0082886 A1 Apr. 5, 2012

(30) Foreign Application Priority Data

Sep. 30, 2010 (JP) ................................. 2010-221461

(51) Int. Cl.
*H01M 2/02* (2006.01)
*H01M 6/42* (2006.01)

(52) U.S. Cl.
USPC .......................................... 429/178; 429/160

(58) Field of Classification Search
None
See application file for complete search history.

(56) References Cited

U.S. PATENT DOCUMENTS

| | | | | |
|---|---|---|---|---|
| 1,368,817 A | * | 2/1921 | Marko | 429/175 |
| 4,033,664 A | * | 7/1977 | Norman | 439/388 |
| 5,706,166 A | * | 1/1998 | Schweikert et al. | 361/520 |

FOREIGN PATENT DOCUMENTS

| | | |
|---|---|---|
| JP | 11-250950 A | 9/1999 |
| JP | 2003-109578 A | 4/2003 |
| JP | 2006-060181 A | 3/2006 |
| JP | 2009-277393 A | 11/2009 |

OTHER PUBLICATIONS

Japanese Office Action dated Nov. 27, 2012, issued in corresponding Japanese Patent Application No. 2010-221461.

* cited by examiner

*Primary Examiner* — Cynthia Walls
(74) *Attorney, Agent, or Firm* — Westerman, Hattori, Daniels & Adrian, LLP

(57) ABSTRACT

In this assembled battery, connections between electrode terminals of electrical cells and connection members for the electrode terminal are reliably maintained for a long period of time. The electrode terminal is formed in a tapered pillar shape whose width decreases from the front end of the electrode terminal toward a battery case. Also, a groove, which is shaped from the front end toward the battery case and divides at least a portion of the front end into segmented portions, is provided to the electrode terminal. The segmented portions are elastically deformable to move close to or away from each other. The bus bar (connection member for the electrode terminals) includes a through-hole whose width decreases from the front end of the electrode terminal toward a battery case. The bus bar is fitted to the electrical terminal, by elastically deforming and moving the segmented portions close to each other.

9 Claims, 5 Drawing Sheets

ASSEMBLED BATTERY

BACKGROUND OF THE INVENTION

1. Field of the Invention

The present invention relates to an assembled battery, in which electrode terminals of electrical cells are connected with a connection member such as a bus bar.

Priority is claimed on Japanese Patent Application No. 2010-221461, filed Sep. 30, 2010. The content is incorporated herein by reference.

2. Description of Related Art

In an assembled battery, an electrode terminal of an electrical cell and a connection member such as a bus bar are connected to each other by using a bolt or by welding the bus bar to the electrode terminal.

In Japanese Patent Application Laid-Open No. 2006-60181 (for example, see FIG. 23 in the Laid-Open), there are a wiring connection portion as an electrode terminal having a slit formed in a minus (−) or plus (+) shape in the plan view and a wiring plate as a connection member for an electrode terminal to fit into the slit.

In Japanese Patent Application Laid-Open No. 2003-109578 (for example, see FIG. 7 in the Laid-Open), there is a connection terminal connected to an electrode terminal having a tapered shape of which the diameter decreases toward the front end. The connection terminal having a slit includes a conductive tapered pipe having cylindrical shape and a resinous portion having a male screw portion. Then, when the connection terminal is fastened by a resinous insulating cap having a female screw portion, the connection terminal is tucked inward in the radial direction, and the conductive tapered pipe is fastened and fixed to the electrode terminal.

However, in the structure between the electrode terminal and the connection terminal in the above-described related art, there is a problem that a bolt is loosened due to vibration or the like in use. For this reason, in the structure using a bolt, the connection may not be reliably maintained for a long period of time. On the other hand, in the structure using the welding, when the members are once fixed to each other, the members cannot be separated from each other. Therefore, a crack may occur in the welding portion due to vibration.

And as to the wiring connection portion disclosed in Japanese Patent Application Laid-Open No. 2006-60181, the wiring plate is fitted to the slit. Therefore, it is difficult that the wiring connection portion and the wiring plate are connected to each other. It means that the wiring plate may be separated from the wiring connection portion due to vibration or the like in use.

Furthermore, since the connection terminal disclosed in Japanese Patent Application Laid-Open No. 2003-109578 is formed in a tapered shape of which the diameter decreases toward the insulating cap, the connection terminal may be separated from the insulating cap due to vibration. Also, since the screw structure is adopted in the connection terminal disclosed in Japanese Patent Application Laid-Open No. 2003-109578, the screw may be loosened due to vibration. Thus, the problem regarding the bolt has not be solved.

SUMMARY OF THE INVENTION

The invention is made in view of the above-described problems, and it is an object of the invention to provide an assembled battery capable of reliably maintaining an electrode terminal and a connection member to be connected to each other for a long period of time.

An aspect of the present invention is an assembled battery including: a first electrical cell that includes an electrode terminal; a second electrical cell that includes an electrode terminal and is positioned next to the first electrical cell; and a connection member that connects the electrode terminals of the first and the second electrical cells to each other, wherein each of the electrode terminals of the first and the second electrical cells is formed in tapered pillar shapes of which the width decreases from the front end thereof toward a battery case, and includes a groove, shaped from the front end toward the battery case and dividing at least a portion of the front end into a plurality of segmented portions, and a recessed portion formed at the outer peripheral surface thereof, and wherein the connection member includes a through-hole in order that the electrode terminal having the segmented portions moved close to each other is inserted and fitted to the through hole.

In the assembled battery of the aspect of the present invention, the electrode terminal is formed in tapered pillar shapes of which the width decreases from the front end thereof toward a battery container. Also, the groove is shaped from the front end of the electrode terminal toward the battery case in order to divide at least a portion of the front end of the electrode terminal into a plurality of segmented portions in the circumferential direction, and the segmented portions are elastically deformable to move close to each other or away from each other. For this reason, when a force is applied inward from the outside of the electrode terminal and the segmented portions are elastically deformed to move close to each other, the width of the groove decreases and the width of the electrode terminal can be decreased. As a result, the electrode terminal can be inserted and fitted into the through-hole of the connection member.

Then, when the force applied to the electrode terminal is released, the electrode terminal is widened outward. Therefore, the distance between the segmented portions is increased and the electrode terminal is fitted to the through-hole by pressing the inner peripheral surface of the through-hole of the connection member. Because each of the electrode terminal and the through-hole is formed in tapered pillar shape, of which the width decreases from the front end thereof toward a battery case, it is possible to prevent the connection member from being separated from the widened front end of the electrode terminal and thus reliably maintain the electrode terminal and the connection member to be connected to each other.

Further, in the assembled battery according to the aspect of the present invention, it is preferable that the recessed portion, formed at the outer peripheral surface of the electrode terminals, fits to the inner peripheral surface of the through-hole of the connection member.

Accordingly, it is possible to prevent the connection member from being separated from the electrode terminal and to easily fix (align) the position between the connection member and the electrode terminal.

Further, in the assembled battery according to the aspect of the present invention, it is preferable that the assembled battery further includes a fixing member including a base arranged on the front end surface of the electrode terminal, a protruding portion protruding from the base toward the electrode terminal to be fitted to the groove, and a locking portion connected to the base to lock the connection member.

Accordingly, because the protruding portion widens the width of the groove, the electrode terminal is pressed against the inner peripheral surface of the through-hole of the connection member, the electrode terminal and the connection member can be more reliably maintained to be connected to each other.

According to the invention, the electrode terminal and the connection member can be reliably maintained to be connected to each other for a long period of time.

The second aspect of the present invention is an assembled battery including: a first electrical cell that includes a first positive electrode terminal and a first negative electrode terminal formed in tapered pillar shape of which the width decreases from its front end and having a groove extending from the front end to divide the front end into a plurality of segmented portions that are elastically deformable; a second electrical cell that includes a second negative electrode terminal and a second positive electrode terminal formed in the tapered pillar shape of which the width decreases from its front end and having a groove extending from the front end to divide the front end into a plurality of segmented portions that are elastically deformable; and a connection member having a first through-hole to be inserted and fitted to the segmented portions of the first negative electrode terminal and a second through-hole to be inserted and fitted to the segmented portions of the second positive electrode terminal.

The assembled battery of the second aspect of the present invention may further include a first recessed portion formed at the outer peripheral surface of the first negative electrode terminal for fitting the connection member; and a second recessed portion formed at the outer peripheral surface of the second positive electrode terminal for fitting the connection member.

Also, the assembled battery of the second aspect of the present invention may further include a first bump portion formed in the inner peripheral surface of the first through-hole for fitting the first recessed portion; and a second bump portion formed in the inner peripheral surface of the second through-hole for fitting the second recessed portion.

Also, the assembled battery of the second aspect of the present invention may further include a first slope surface formed at the outer periphery of the front end of the first negative electrode terminal; and a second slope surface formed at the outer periphery of the front end of the second positive electrode terminal.

Also, in the assembled battery of the second aspect of the present invention, the number of the segmented portions of the first negative electrode terminal may be the same number of the segmented portions of the second positive electrode terminal.

DETAILED DESCRIPTION OF THE INVENTION

Hereinafter, an assembled battery according to a first embodiment of the present invention will be described by referring to FIGS. 1 to 4.

Figure 1:
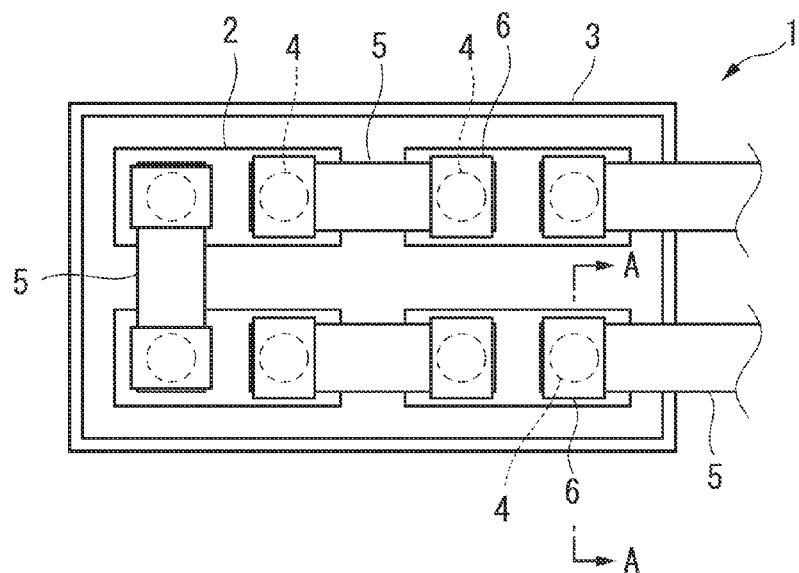
FIG. 1 is a diagram illustrating an example of an assembled battery according to a first embodiment of the invention.

As shown in FIG. 1, an assembled battery 1 according to the first embodiment includes: a plurality of electrical cells 2 that is arranged in two dimensions; a container 3 in which the electrical cells 2 are storaged; a bus bar (a connection member for electrode terminals) 5 that connects electrode terminals 4 of the adjacent electrical cells 2 to each other; and a fixing member 6 that fixes the electrode terminal 4 and the bus bar 5. As an example of connecting the electrical cells 2 to each other through the bus bar 5, the positive terminal of the first electrical cell is connected to the negative terminal of the second electrical cell through the bus bar 5, and the negative terminal of the first electrical cell is connected to the positive terminal of the third electrical cell through the bus bar 5. The assembled battery 1 is configured by connecting the adjacent electrical cells 2 to each other through the bus bar 5 in this manner.

Figure 2:
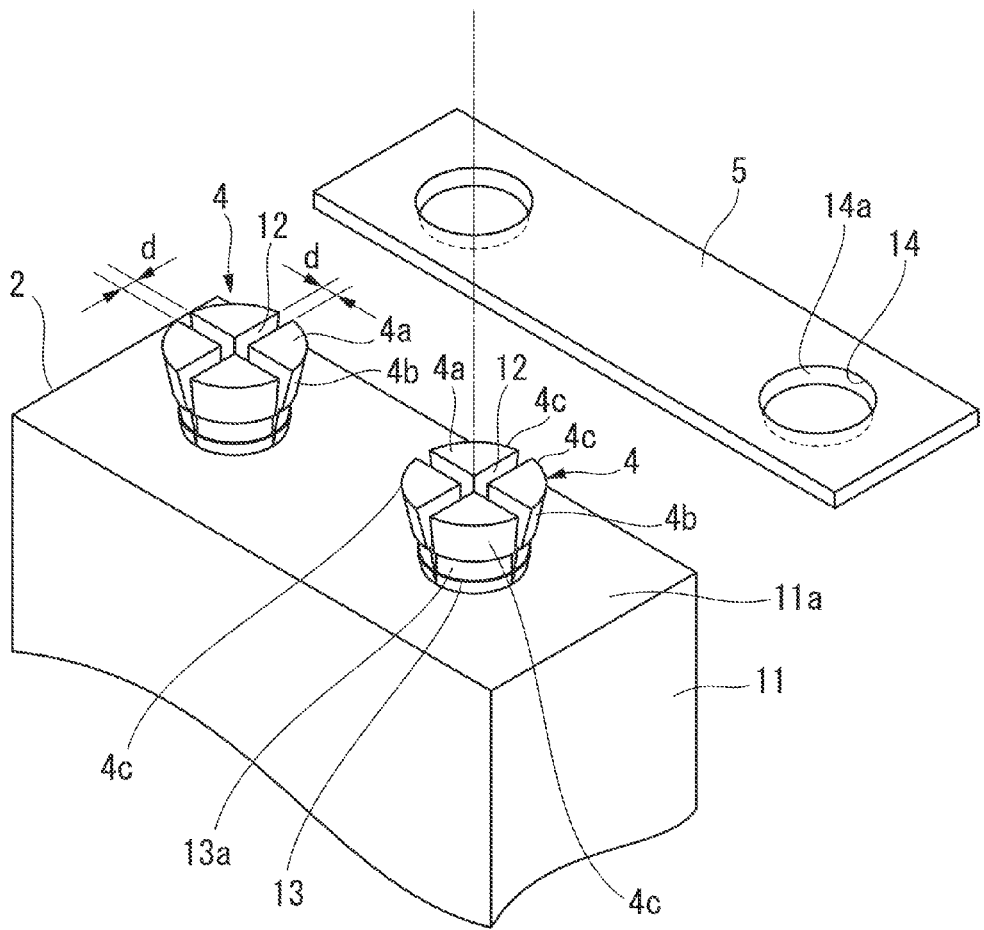
FIG. 2 is a perspective view illustrating an electrical cell and a bus bar.

As shown in FIG. 2, each electrical cell 2 includes: a battery case 11 which stores a plurality of electrode plates (not shown) and which shape is substantially rectangular parallelepiped shape; and the electrode terminals 4 that protrude upward from a top surface 11a of the battery case 11 and that are as the positive electrode terminal and the negative electrode terminal.

The electrode terminal 4 is formed of an elastically deformable conductive material or the like and has a conical shape of which the diameter decreases from the front end 4a toward the battery case 11. As the elastically deformable conductive material, there are Beryllium copper and A 6000-series aluminum alloy as the examples.

The electrode terminal 4 has grooves 12 that divide the electrode terminal 4 to four segmented portions 4c in the circumferential direction from the front end 4a toward the top surface 11a of the battery case 11 into four. The groove 12 has a cross shape in plan view. The groove 12 has a predetermined width "d". When a force is applied inward from the outer periphery 4b of the electrode terminal 4, the four segmented portions 4c are elastically deformed to move close to each other, so that the width "d" of the groove 12 reduces. In this manner, the outer diameter of the electrode terminal 4 can be decreased. In this step, since the electrode terminal 4 is elastically deformable, when the force applied from the outer periphery 4b of the electrode terminal 4 is released, the four segmented portion 4c move away from each other. Therefore, the width of the groove 12 can be returned to the original value "d".

Further, at a bottom portion 13 in the electrode terminal 4, a recessed portion 13a is formed in the surface of the outer periphery 4b along its circumference.

The bus bar 5 is a plate-shaped member that is formed of a conductive material such as copper. At each ends of the bus bar 5, a through-hole 14 is formed, that allow the electrode terminal 4 to be fitted thereto, when the electrode terminals 4 is inserted into the through-hole in the thickness direction. An inner peripheral surface 14a of the through-hole 14 is formed in a conical shape of which the diameter decreases from the top surface of the bus bar 5 toward the bottom surface thereof. As described below, the inner peripheral surface 14a is formed in order that the through-hole 14 of the bus bar 5 and the recessed portion 13a of the electrode terminal 4 are fitted to each other when the bus bar 5 is attached to the electrode terminal 4.

Next, a method of attaching the bus bar 5 to the electrode terminal 4 is described.

Figure 3A:
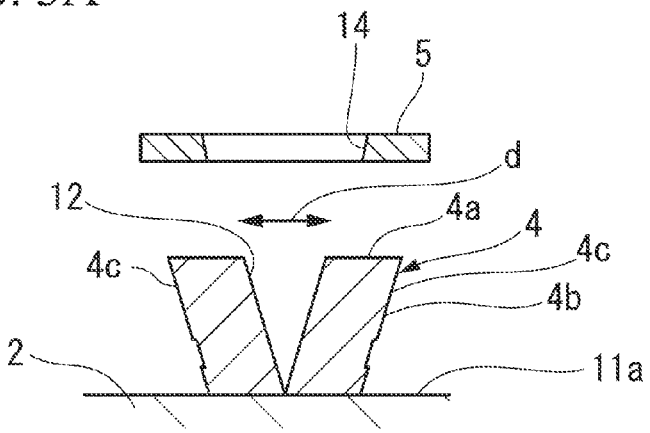
FIGS. 3A to 3D are diagrams illustrating a state where the bus bar is attached to the electrode terminal at the cross-section taken along the line A-A of FIG. 1.
Figure 3B:
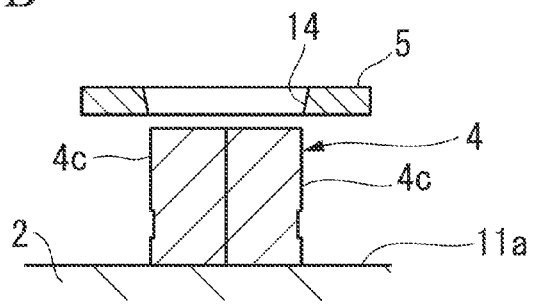

First, the electrode terminal 4 (for example, the positive terminal) shown in FIG. 3A is clamped from the outer periphery 4b by using a tool or the like, and four segmented portions 4c are moved to each other to narrow the width "d" of the groove 12. As the result, the outer diameter of the electrode terminal 4 is decreased as shown in FIG. 3B.

Figure 3C:
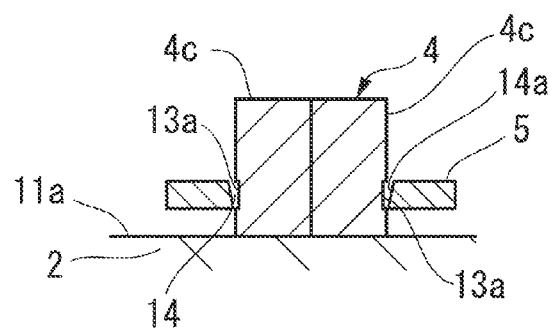

Then, as shown in FIG. 3C, the electrode terminal 4 is pressed and inserted to the through-hole 14 of the bus bar 5.

At this time, the surface of the bus bar 5 of which the through-hole 14 has a smaller diameter is faced to and directed to the top surface 11a of the battery case 11. In other words, the undersurface of the bus bar 5 is arranged to face to the top surface 11a thereof, and the bus bar 5 is pressed and inserted to the position where the inner peripheral surface 14a fits in the recessed portion 13a of the electrode terminal 4.

Figure 3D:
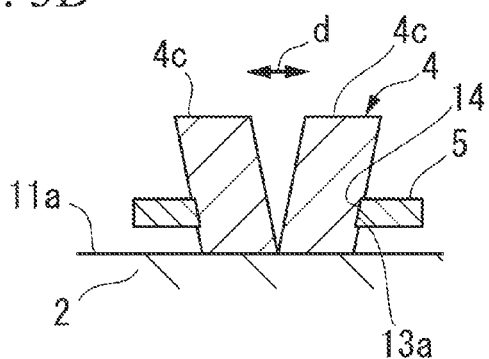

Then, as shown in FIG. 3D, clamping of the electrode terminal 4 is released, and four segmented portions 4c are moved away from each other to widen the width of the narrowed groove 12 to the width "d". As the result, the bus bar 5 is fitted to the recessed portion 13a of the electrode terminal 4. In this step, the recessed portions 13a of four segmented portions 4c of the electrode terminal 4 are widened outward in the radial direction, and pushing the inner peripheral surface 14a of the through-hole 14. As a result, the electrode terminal 4 is attached and connected to the bus bar 5.

Then, the bus bar 5 is connected to the electrode terminal 4 (for example, the negative terminal) of the adjacent electrical cell 2 in the same manner as mentioned above. The assembled battery 1 is configured by connecting different electrode terminals of the adjacent electrical cells 2 to each other in this manner.

Next, the fixing member 6, that fixes the electrode terminal 4 and the bus bar 5 after the bus bar 5 is attached to the electrode terminal 4, is described.

Figure 4:
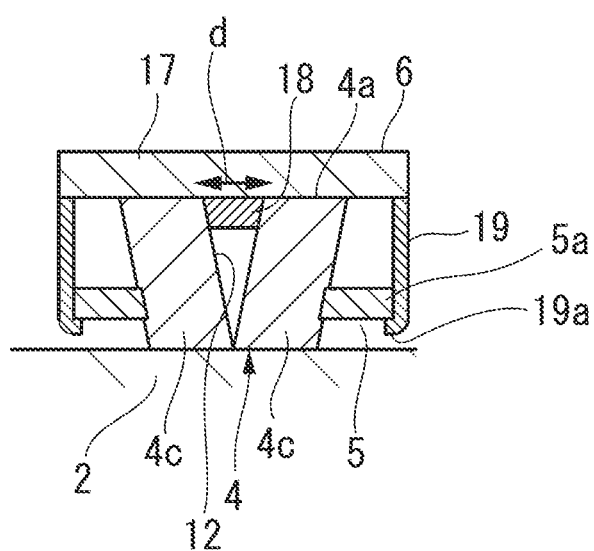
FIG. 4 is a diagram illustrating an example of a fixing member of the assembled battery according to the first embodiment and is a cross-sectional view taken along the line A-A of FIG. 1.

As shown in FIG. 4, the fixing member 6 includes: a base 17 arranged on a surface of the front end 4a of the electrode terminal 4; a protruding portion 18 protruding from the base 17 toward the electrode terminal 4 to be fitted into the groove 12; and a plurality of locking portions 19 connected to the base 17 to lock the bus bar 5.

The protruding portion 18 is formed to have a width thereof slightly larger than the width "d" of the groove 12 of the electrode terminal 4 attached to the bus bar 5, and the protruding portion 18 widens the groove 12 when the protruding portion 18 fits into the groove 12.

The plurality of locking portions 19 is formed on the base 17. As shown in FIG. 4, each locking portion 19 includes a front end 19a formed in a hook shape, and locks the base 17 by hanging the front end 19a on the end 5a of the bus bar 5. In this manner, the fixing member 16 can fix the electrode terminal 4 and the bus bar 5 by engaging the base 17 and the bus bar 5 with each other through the locking portion 19.

The fixing member 6 may be formed of an insulating material or a conductive material. And the fixing member 6 may have a function, for example, as a connection terminal to connect a wire for measuring the voltage.

Next, the effect of the assembled battery of the first embodiment is described by referring to the drawings.

According to the assembled battery 1 of the first embodiment, the electrode terminal 4 is formed in a conical shape, and the groove 12 is formed to divide the electrode terminal 4 into four segmented portions 4c in the circumferential direction in order that the segmented portions 4c is able to deform elastically to move close to each other or away from each other. Then, when a force is applied inward from the outer periphery 4b, the width "d" of the groove 12 is narrowed, and the segmented portions 4c move close to each other. Therefore, the diameter of the electrode terminal 4 is decreased. Further, when the force is released, the width returns to the original value "d". Because the inner diameter of the through-hole 14 of the bus bar 5 is set to be smaller than the outer diameter of the electrode terminal 4 at the position of the recessed portion 13a when the electrode terminal 4 is detached from the through-hole 14, the bus bar 5 can be inserted to the electrode terminal 4 when the width of the groove 12 of the electrode terminal 4 is narrowed. Further, when the narrowed width of the groove 12 is widened, the recessed portion 13a of the electrode terminal 4 pushes the through-hole 14 of the bus bar 5. Therefore, the bus bar 5 is connected to the electrode terminal 4 tightly.

According to the assembled battery 1 of the embodiment, the connection between the electrode terminal 4 and the bus bar 5 can be maintained, because the bus bar 5 does not fall off from the electrode terminal 4 easily.

Further, when the fixing member 6 is attached to the electrode terminal 4 and the bus bar 5, the protruding portion 18 widens the width "d" of the groove 12. Therefore, the electrode terminal 4 pushes the bus bar 5, and the fixing member 16 fixes the electrode terminal 4 and the bus bar 5. As the result, it is possible to prevent the bus bar 5 from being fallen off from the electrode terminal 4 and to align the position between the electrode terminal 4 and the bus bar 5 easily.

Next, the second embodiment is described by referring to FIGS. 5A to 5D. However, the same or equivalent components as or to those of the first embodiment will not be described by giving the same reference numerals thereto, and the configuration different from that of the first embodiment is described.

Figure 5A:
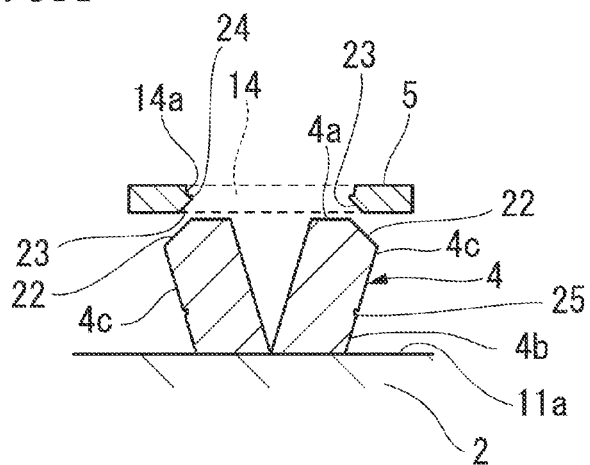
FIGS. 5A to 5D are diagrams illustrating an electrode terminal and a bus bar of an assembled battery according to a second embodiment of the invention.

As shown in FIG. 5A, in an assembled battery 21 of the second embodiment, a slope surface 22 of the electrode terminal 4 is formed by chamfering the front end 4a of the outer periphery 4b. Further, a slope surface 23 of the bus bar 5 is formed by chamfering the lower portion of the through-hole 14.

A bump portion 24 is formed in the inner peripheral surface 14a of the through-hole 14, which protrudes toward the center of the through-hole 14 in the circumferential direction. Then, a recessed portion 25 is formed in the surface of the outer periphery 4b of the electrode terminal 4 in the circumferential direction to be fitted to the bump portion 24.

Figure 5B:
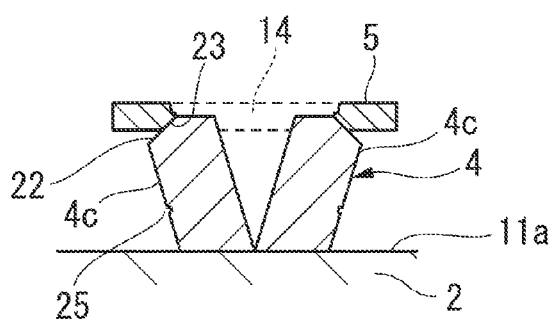
Figure 5C:
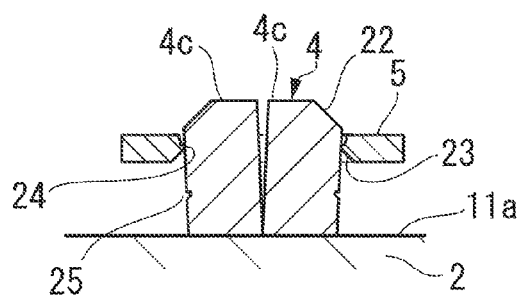
Figure 5D:
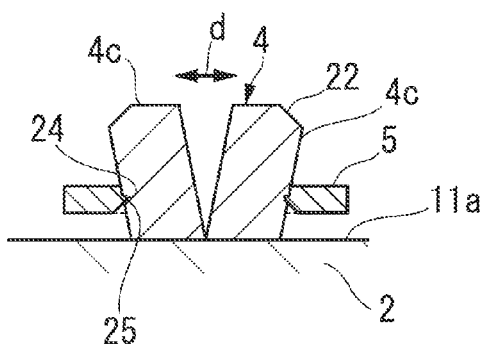

In the second embodiment, as shown in FIG. 5B, the bus bar 5 is attached to the electrode terminal 4 in a manner such that the bus bar 5 is pressed against the top surface 11a of the battery case 11 after the slope surface 22 of the electrode terminal 4 comes into contact with the slope surface 23 of the through-hole 14 of the bus bar 5. Because the slope surface 22 of the electrode terminal 4 is pressed while being brought into contact with the slope surface 23 of the through-hole 14 of the bus bar 5, the segmented portions 4c of the electrode terminal 4 move close to each other and the width "d" of the groove 12 is narrowed. Therefore, the electrode terminal 4 is inserted into the through-hole 14 of the bus bar 5 as shown in FIG. 5C. Then, as shown in FIG. 5D, the bus bar 5 moved downward is attached and connected to the electrode terminal 4 in a manner such that the bump portion 24 is fitted to the recessed portion 25 of the electrode terminal 4.

Subsequently, the electrode terminal 4 and the bus bar 5 are fixed by using the fixing member 6 (not shown) in the same manner as the first embodiment.

In the assembled battery 1 according to the second embodiment, the same effect as that of the first embodiment is obtained. In addition, since the width "d" of the groove 12 can be narrowed by using the elastic deformation of the electrode terminal 4, when the bus bar 5 is pressed and inserted into the electrode terminal 4, the bus bar can be easily attached to the electrode terminal 4.

While the embodiments of the assembled battery of the invention have been described, the invention is not limited to the above-described embodiments, and may be appropriately modified within the scope of the spirit of the invention.

Figure 6A:
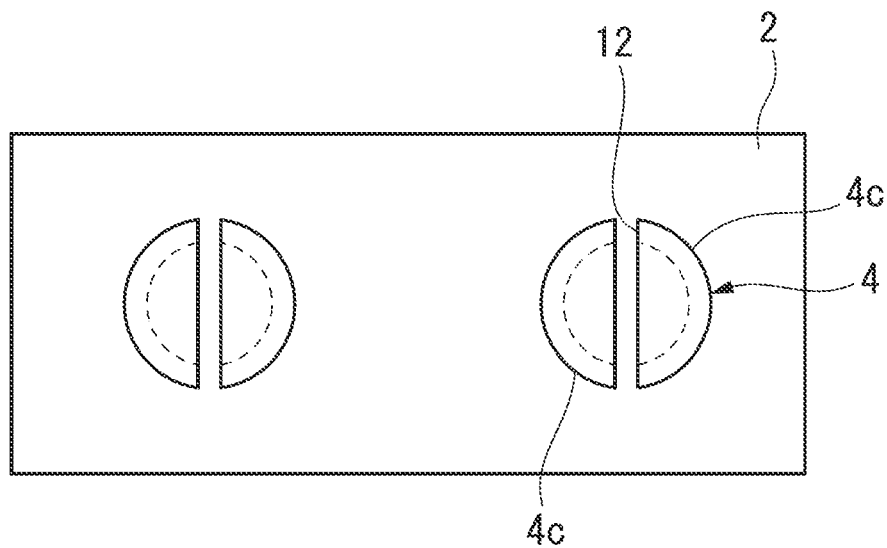
FIGS. 6A and 6B are diagrams illustrating a modified example of the electrode terminal of the assembled battery according to the first embodiment.
Figure 6B:
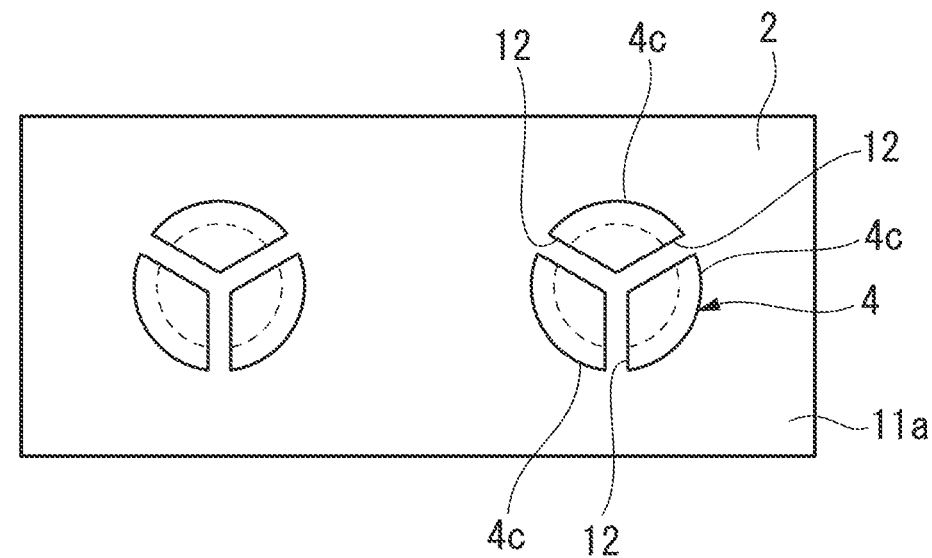

For example, in the above-described embodiments, the groove 12 of the electrode terminal 4 is formed in a cross shape in the plan view and the electrode terminal 4 is divided to four segmented portions 4c by the groove 12. However, as shown in FIGS. 6A and 6B, the groove 12 may be arranged to divide the electrode terminal 4 into two, three or more as the segmented portions 4c.

In the above-described embodiments, the electrode terminal 4 is formed in a conical shape, but may be formed in any tapered pillar shape of which width decreases from the front end toward the battery case, such as a square pyramid. Further, the through-hole 14 of the bus bar 5 may also be formed in any shape instead of the conical shape corresponding to the shape of the electrode terminal 4.

In the above-described embodiments, the groove 12 of the electrode terminal 4 is formed from the front end 4a toward the top surface 11a of the battery case 11, but the groove 12 may be formed at a part of the front end 4a of the electrode terminal 4 and the segmented portions 4c are elastically deformable.

In the above-described embodiments, the electrode terminal 4 is formed of beryllium copper or A 6000-series aluminum alloy, but may be formed of any elastically deformable conductive material.

In the above-described embodiments, the fixing member 6 is provided, but the fixing member 6 may be omitted.

Further, in the above-described embodiments, the recessed portion 13a and the recessed portion 25 are formed at the surface of the outer periphery 4b of the electrode terminal 4. However, the surface of the outer periphery 4b of the electrode terminal 4 may come into contact with the inner peripheral surface 14a of the through-hole 14 of the bus bar 5 without providing the recessed portion 13a or the recessed portion 25.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An assembled battery comprising:
   a first electrical cell that includes an electrode terminal;
   a second electrical cell that includes an electrode terminal and is positioned next to the first electrical cell; and
   a connection member that connects the electrode terminals of the first and the second electrical cells to each other,
   wherein each of the electrode terminals of the first and the second electrical cells is formed in tapered pillar shape of which the width decreases from the front end thereof toward a battery case, and includes a groove, shaped from the front end toward the battery case and dividing at least a portion of the front end into a plurality of segmented portions, and a recessed portion formed at the outer peripheral surface thereof, and
   wherein the connection member includes a through-hole in order that the electrode terminal having the segmented portions moved close to each other is inserted and fitted to the recessed portion.

2. The assembled battery according to claim 1,
   wherein the recessed portion formed at the outer peripheral surface of the electrode terminals fits to the inner peripheral surface of the through-hole of the connection member.

3. The assembled battery according to claim 1, further comprising:
   a fixing member that includes:
      a base arranged on the front end surface of the electrode terminal,
      a protruding portion protruding from the base toward the electrode terminal to be fitted to the groove, and
      a locking portion connected to the base to lock the connection member.

4. The assembled battery according to claim 2, further comprising:
   a fixing member that includes:
      a base arranged on the front end surface of the electrode terminal,
      a protruding portion protruding from the base toward the electrode terminal to be fitted to the groove, and
      a locking portion connected to the base to lock the connection member.

5. An assembled battery comprising:
   a first electrical cell that includes a first positive electrode terminal and a first negative electrode terminal formed in tapered pillar shape of which the width decreases from its front end and having a groove extending from the front end to divide the front end into a plurality of segmented portions that are elastically deformable;
   a second electrical cell that includes a second negative electrode terminal and a second positive electrode terminal formed in the tapered pillar shape of which the width decreases from its front end and having a groove extending from the front end to divide the front end into a plurality of segmented portions that are elastically deformable; and
   a connection member having a first through-hole to be inserted and fitted to the segmented portions of the first negative electrode terminal and a second through-hole to be inserted and fitted to the segmented portions of the second positive electrode terminal.

6. The assembled battery according to claim 5, further comprising:
   a first recessed portion formed at the outer peripheral surface of the first negative electrode terminal for fitting the connection member; and
   a second recessed portion formed at the outer peripheral surface of the second positive electrode terminal for fitting the connection member.

7. The assembled battery according to claim 6, further comprising:
   a first bump portion formed in the inner peripheral surface of the first through-hole for fitting the first recessed portion; and
   a second bump portion formed in the inner peripheral surface of the second through-hole for fitting the second recessed portion.

8. The assembled battery according to claim 7, further comprising:
   a first slope surface formed at the outer periphery of the front end of the first negative electrode terminal; and
   a second slope surface formed at the outer periphery of the front end of the second positive electrode terminal.

9. The assembled battery according to claim 8, wherein the number of the segmented portions of the first negative electrode terminal is the same number of the segmented portions of the second positive electrode terminal.

\* \* \* \* \*